(12) United States Patent
Zeng et al.

(10) Patent No.: US 6,735,051 B2
(45) Date of Patent: May 11, 2004

(54) SUSPENSION HAVING MOTION LIMITER FOR USE WITH UPSTREAM-ORIENTED HEADS

(76) Inventors: Qinghua Zeng, 40495 Chapel Way, Apt. 24, Fremont, CA (US) 94538; Toshiki Hirano, 4751 Elmhurst Dr., San Jose, CA (US) 95120; Tzong-Shii S. Pan, 1052 Lancer Dr., San Jose, CA (US) 95129; Francis C. Lee, 1112 Foxhurst Way, San Jose, CA (US) 95120

( * ) Notice: Subject to any disclaimer, the term of this patent is extended or adjusted under 35 U.S.C. 154(b) by 0 days.

(21) Appl. No.: 10/460,910

(22) Filed: Jun. 12, 2003

(65) Prior Publication Data

US 2003/0214750 A1 Nov. 20, 2003

Related U.S. Application Data

(62) Division of application No. 09/920,534, filed on Jul. 31, 2001.

(51) Int. Cl.[7] .................................................. G11B 5/55
(52) U.S. Cl. ........................................................ 360/245.7
(58) Field of Search ....................................... 360/245.7

(56) References Cited

U.S. PATENT DOCUMENTS

| 5,218,496 A | 6/1993 | Kaczeus | 360/106 |
| 5,343,347 A | 8/1994 | Gilovich | 360/106 |
| 5,471,733 A | 12/1995 | Bernett | 360/98.01 |
| 6,057,990 A | 5/2000 | Gilovich | 360/106 |
| 6,445,546 B1 * | 9/2002 | Coon | 360/245.7 |
| 6,498,702 B1 | 12/2002 | Shimizu | 360/244.1 |
| 6,538,850 B1 * | 3/2003 | Hadian et al. | 360/245.7 |

OTHER PUBLICATIONS

Michael W. Davis, "A New Spin on Suspension Windage," Insight, Mar./Apr. 2001, p. 8–12.

"Design to Densely Package Small Form Factor HDA," IBM Technical Disclosure Bulletin, vol. 37, No. 03, Mar. 1994.

\* cited by examiner

*Primary Examiner*—A. J. Heinz
(74) *Attorney, Agent, or Firm*—Lumen Intellectual Property Services, Inc.

(57) ABSTRACT

The present invention is directed towards a suspension for use with heads that are positioned upstream of the actuator arm in a disk drive. The suspension includes a motion limiter to limit displacement both away from the load beam and towards the flexure proximal end. The suspension also includes traces with connections located on the proximal end of the gimbaled region of the flexure for making electrical contact with a head on a slider.

3 Claims, 17 Drawing Sheets

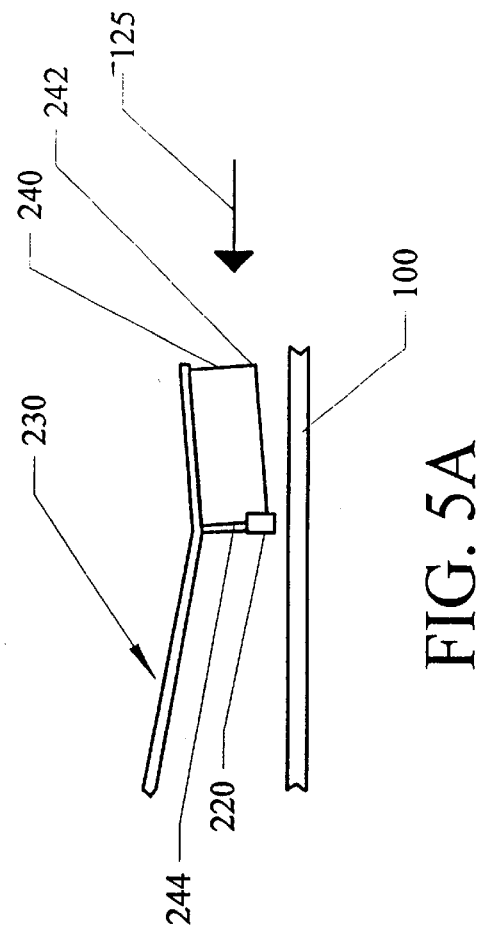
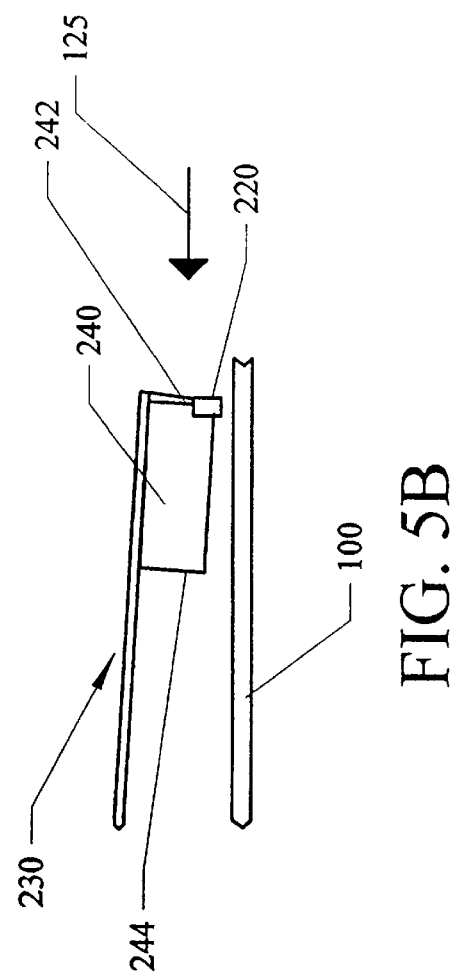
FIG. 5A
FIG. 5B

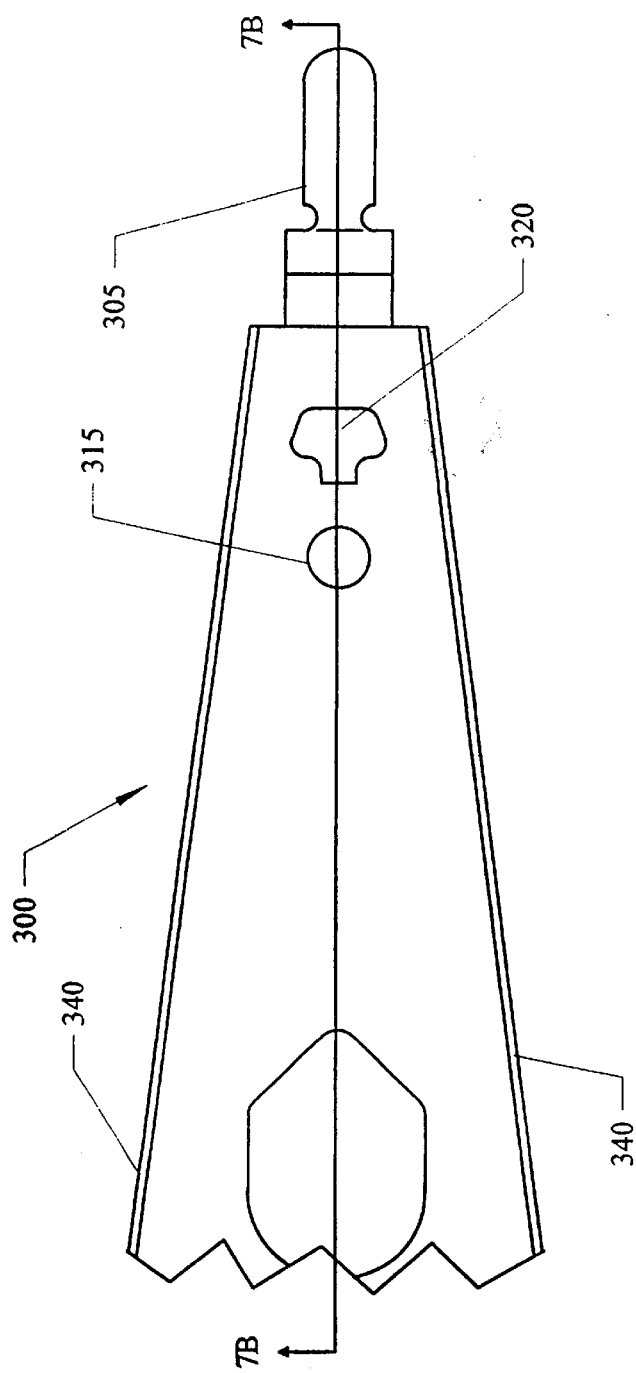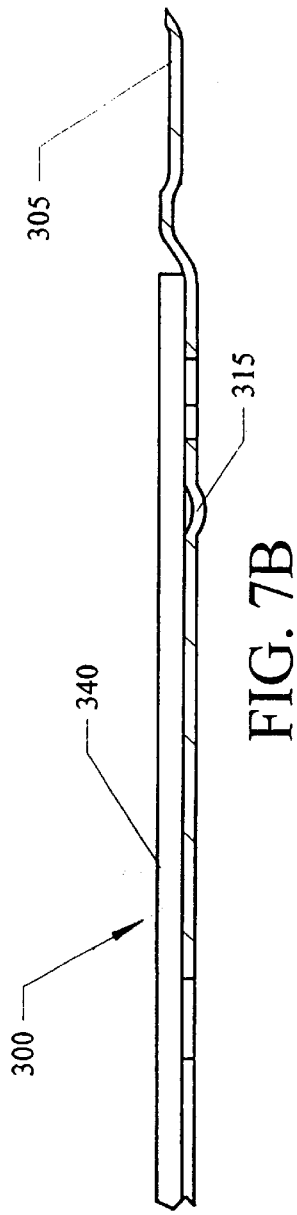
FIG. 7A
FIG. 7B

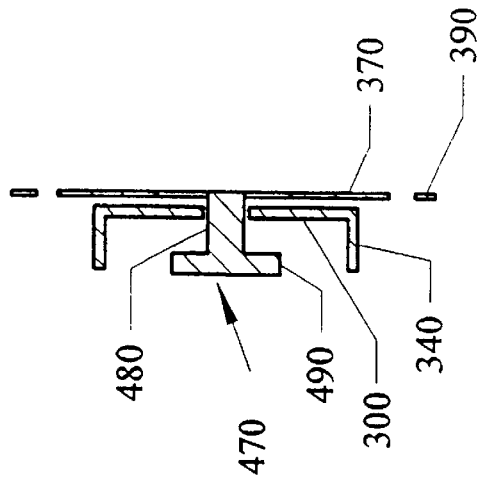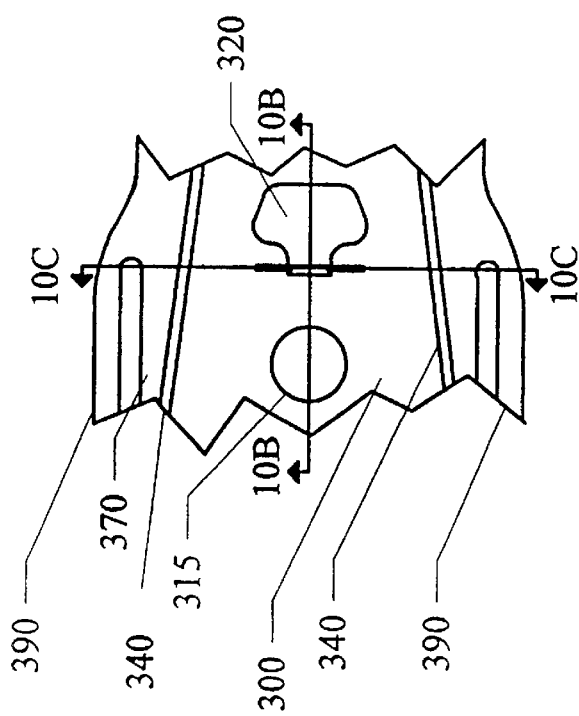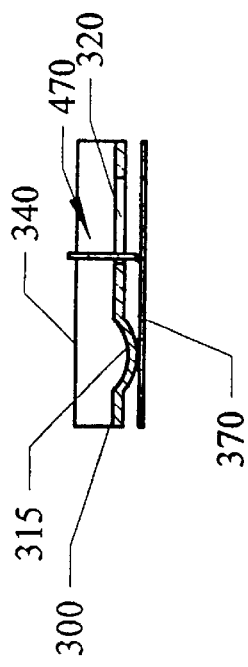

SUSPENSION HAVING MOTION LIMITER FOR USE WITH UPSTREAM-ORIENTED HEADS

CROSS-REFERENCE TO RELATED APPLICATIONS

This application is a divisional of copending U.S. patent application Ser. No. 09/920,534 filed Jul. 31, 2001, the entire contents of which are hereby incorporated by reference.

FIELD OF THE INVENTION

The present invention relates to disk drives. In particular, it is directed to disk drives in which the head is located upstream of the actuator arm.

BACKGROUND OF THE INVENTION

Disk drives are data storage devices that are commonly used in many applications. In a typical hard-disk drive, a disk enclosure houses a spindle that supports and spins a stack of disks and an actuator that positions a comb of head-carrying assemblies. At least one transducer element, (referred to here as a head) reads and/or writes data to and/or from each disk and is carried by each head-carrying assembly.

One of the challenges of disk-drive design is to maintain the head at a very precise location that is preferably a very small fixed distance above the disk. Variations in the height of the head from the disk, the radial location of the head over the disk, and the roll and pitch angles of the head increase the probability of read/write errors. An exceptional design would hold the head at a fixed height and orientation above the disk regardless of any conceivable disturbance.

Modern disk-drive design attempts to achieve these goals through the use of an air-bearing slider designed to fly over the spinning disk. The head is either formed as part of the slider, or is mounted to it. As the disk spins, the air adjacent to the disk is induced to rotate substantially with the disk. The slider flies in the induced flow. The aerodynamic forces generated on the slider are generally balanced by a suspension to which the slider is attached. A balance between the design aerodynamic forces on the slider and the restoring elastic forces imposed by the suspension helps to maintain the slider, and hence the head, at the desired fly height and angle.

Traditional disk drives are arranged as shown in FIG. 1. A shroud 105 partially encloses at least one disk 100 that is supported by a spindle 150 that rotates the disks. For convenience, FIG. 1 shows only a single disk although many more may be part of the disk stack. The disk 100 spins in a spinning direction 120. The air between adjacent disks (or if no adjacent disk exists, in the vicinity of the disk 100) is dragged with the disk 100, thereby inducing a flow 125 that rotates substantially with the disk 100. The head-carrying assembly 200 is comprised of an actuator arm 210, a suspension 230, and a slider, which is not shown in FIG. 1, but which would be attached to the suspension 230 in the vicinity of the distal end 204 of the head-carrying assembly 200. As mentioned earlier, a head would be mounted on, or be integral with, the slider. To position the head over the disk 100, the head-carrying assembly 200 is usually designed to rotate about a point in the vicinity of its proximal end 202. A rotary actuator rotates the head-carrying assembly 200 in response to signals received from an actuator electronics package, which determines exactly how much the head-carrying assembly 200 must rotate for the head to reach the desired position. Linear actuators, in which the head-carrying assembly is moved linearly to position the head over a desired radius of the disk, are currently less commonly used.

In the traditional configuration, the introduction of the head-carrying assembly 200 into the flow induced by the disk 100 distorts the substantially solid-body rotation of the flow. As seen in FIG. 1, the head-carrying assembly 200 blocks the smooth passage of the air. (As used herein, the word "air" denotes whatever fluid is between the disks.) The bulk of the air is channeled through the gap between the spindle 150 and the distal end 204 of the head-carrying assembly 200. Most of the remaining air is deflected outwardly. In practice, a small portion of the air will also squeeze between the head-carrying assembly 200 and the disk 100 or an adjacent disk (not shown) in the disk stack.

The traditional arrangement causes a number of problems. The flow that is channeled through the gap between the spindle 150 and the distal end of the head-carrying assembly 204 is traveling faster than the disk 100. Because turbulent fluctuations typically scale with flow speed, the increased speed likely implies increased turbulent fluctuation amplitude, and hence larger excitations of the head. In addition, some of the flow channeled through the gap has flowed alongside the edge of the head-carrying assembly 200 for an extended period of time. Turbulence created by the complicated interaction of the flow with the head-carrying assembly 200 will be swept along the suspension 230 and produce additional unsteadiness, which must be damped. The situation is dramatically worsened by the fact that the flow expands rapidly upon exiting the gap between the spindle 150 and the distal end 204 of the head-carrying assembly 200, thereby producing very high-intensity turbulent fluctuations in the vicinity of the head.

One way to circumvent this problem is to position the head upstream of the actuator arm. Positioning one head upstream of the actuator arm is disclosed as a side effect in various prior patents that employ multiple head-carrying assemblies between adjacent disks.

U.S. Pat. No. 5,218,496 to Kaczeus shows a pair of angularly offset head-carrying assemblies disposed between adjacent disks. The head on one head-carrying assembly magnetically cooperates with the lower surface of the upper disk and the head on the other head-carrying assembly magnetically cooperates with the upper surface of the lower disk. The patent mentions that the orientation of the sliders that support the heads on each head-carrying assembly is reversed in the design.

In U.S. Pat. No. 5,343,347 to Gilovich, a disk drive is disclosed in which the positioning relative to the flow between the disks of some heads and actuator arms are reversed from that of others. Gilovich does not address which of the heads are upstream of their actuator arms and which are downstream, nor does he address the fluid-mechanical implications of altering the upstream/downstream relationship between the heads and the actuator arms.

However, in U.S. Pat. No. 6,057,990, also to Gilovich, he indicates that a weakness in his earlier work was that in most cases at least two different and distinct heads would be required (column 1, lines 48–57). He states that he believes that no manufacturer in the industry constructs a transducer head that would accommodate a disk rotating clockwise with a head to the right of the spindle or a disk rotating counterclockwise with a head to the left of the spindle (column 1, lines 28–34). Analysis of these configurations reveals that such orientations correspond to situations in which the head is upstream of the actuator arm.

SUMMARY OF THE INVENTION

Considerable effort has been expended devising schemes to dampen the effects that the turbulent fluctuations have on vibrations of the head. In the current invention, exceptional reduction of head vibration is achieved by decreasing the turbulent fluctuations encountered by the head. Reorienting the head-carrying assembly relative to the flow induced by the spinning disks reduces the turbulent fluctuations.

The reoriented configuration is illustrated schematically in FIG. 2. In the novel configuration, the head-carrying assembly 200 is oriented such that, relative to the induced flow 125, each head (not explicitly shown, but ordinarily carried by the suspension 230) is disposed upstream of its actuator arm 210. The prior art discussed above shows some, but not all, of the heads oriented upstream of their respective actuator arms. The current invention is distinguished from the prior art by requiring that each head-carrying assembly 200 is oriented with its head upstream of its actuator arm 210.

Alternatively, the reoriented configuration can be described by considering the angle between two lines. A first line extends from the disk center 110 to the distal end 204 of the head-carrying assembly 200. A second line extends from the disk center 110 to the pivot 205 about which the head-carrying assembly 200 rotates. In the reoriented configuration, the angle 140 measured in the spinning direction 120 from the first line to the second line is less than 180 degrees for all head-carrying assemblies 200.

A similar geometric description of the reoriented configuration is applicable to both rotary actuators, as shown in FIG. 2, as well as linear actuators, as shown in FIG. 3. A first line is defined to extend from the disk center 110 to the head, a second line from the disk center 110 to the proximal end 202 of the head-carrying assembly 200. The angle 140 measured in the spinning direction 120 from the first line to the second line must be less than 180 degrees.

Compared with a traditionally configured disk drive, as shown in FIG. 1, preferred embodiments of the new configuration provide several beneficial effects. Because the head is upstream of the actuator arm 210, turbulence generated by the interaction of the flow with the actuator arm 210 is no longer convected directly towards the head. In addition, the channeling of the flow through the gap between the distal end 204 of the head-carrying assembly 200 and the spindle 150 is essentially eliminated. Therefore, the flow speed in the vicinity of the head is reduced. In addition, the high-intensity turbulence produced as flow expanded rapidly downstream of the gap in the traditional configuration is also greatly reduced.

The advantages of the preferred embodiments motivate another view of the invention as a method for reducing head vibrations in a disk drive. The reduction in head vibration is achieved by properly orienting each head-carrying assembly. The proper orientation requires the angle, measured in the spinning direction, between a first line that extends from the disk center to the distal end of the head-carrying assembly and a second line that extends from the disk center to the proximal end of the head-carrying assembly be less than 180 degrees.

Various embodiments of the invention also include a specially designed disk drive suspension that is well suited for orientations in which the head is upstream of the actuator arm. The new suspension includes a load beam, a flexure, and a motion limiter. The load beam is typically attached to the actuator arm. The flexure has a proximal end that is mounted to the load beam and an opposing distal end. Flexure legs near the flexure distal end support a gimbaled region, which has its distal end coupled to the flexure legs. A slider is typically fastened to the gimbaled region. The suspension also includes a motion limiter that is fixed to the gimbaled region and interacts with the load beam. Unlike traditional suspensions in which the flexure legs are in tension, upstream orientation of the head typically places the flexure legs in compression. To help avoid buckling of the flexure legs, the motion limiter of the new suspension limits not only the displacement of the gimbaled region away from the load beam (as is done with conventional motion limiters), but also the displacement of the gimbaled region towards to the flexure proximal end. In this way, the motion limiter relieves the flexure legs of excessive compressive loading.

Additional features and advantages of the invention will be set forth in part in the description that follows, and in part will be obvious from the description, or may be learned by practice of the invention. Various embodiments of the invention do not necessarily include all of the stated features or achieve all of the stated advantages.

BRIEF DESCRIPTION OF THE DRAWINGS

The accompanying drawings illustrate a complete embodiment of the invention according to the best modes so far devised for the practical application of the principles thereof, and in which:

FIG. 5A shows a side view of a positively pitched slider attached to a suspension. The pitch angle relative to the disk is exaggerated in the illustration.

FIG. 5B shows a side view of a negatively pitched slider attached to a suspension. The pitch angle relative to the disk is exaggerated in the illustration.

FIG. 7A shows a top view of a load beam.

FIG. 7B shows a cross-section view of the load beam of FIG. 7A.

FIG. 10A shows a top view of a portion of a load beam with a motion limiter attached to a flexure.

FIG. 10B shows a side cross-section view of the load beam with the motion limiter attached to the flexure.

FIG. 10C shows a right cross-section view of the load beam with the motion limiter attached to the flexure.

DETAILED DESCRIPTION OF PREFERRED EMBODIMENTS

Figure 2:
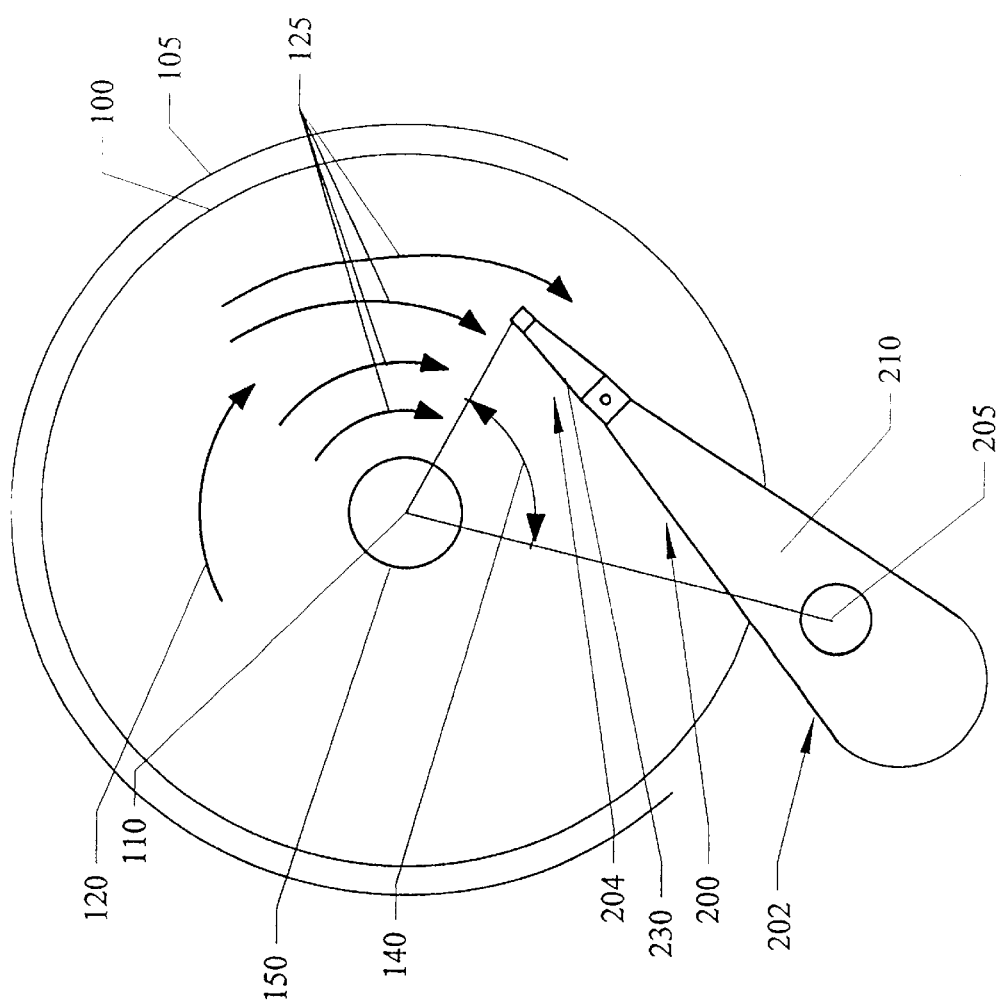
FIG. 2 shows a plan view of a disk drive with the novel orientation of a head-carrying assembly deployable by a rotary actuator.

Referring to the drawings, where similar elements are numbered the same, FIG. 2 depicts a disk drive with a novel orientation. The spinning disk 100 induces a flow 125 that rotates substantially with the disk 100. Multiple disks may be included in a disk stack, but only one is necessary for the invention. Each head-carrying assembly 200 is deployable adjacent to a disk 100 and each head-carrying assembly 200 includes an actuator arm 210, a suspension 230 attached to the actuator arm 210, and a head (not shown), carried by the suspension 230. Each head-carrying assembly 200 is oriented such that, relative to the flow 125 induced by the disk 100, the head is disposed upstream of the actuator arm 210.

To eliminate uncertainty in the use of the term "upstream" in a rotating flow, a body A is defined to be upstream of a body B if the time required for a flow disturbance generated at body A to be observed at body B is less than the time required for a flow disturbance generated at body B to be observed at body A. This definition is intended to reduce to the usual meaning of upstream in the case of bodies at rest in a uniform linear flow.

As currently implemented, the new orientation of the disk drive can be described strictly in terms of geometry. The disk drive includes a disk 100 having a disk center 110. As usual the disk spins in a spinning direction 120. The disk drive further includes at least one head-carrying assembly 200 that is deployable adjacent to the disk 100. The head-carrying assembly 200 has a pivot 205 about which it rotates, a proximal end 202, and an opposing distal end 204, the distal end 204 being closer to the disk center 110 than the proximal end 202. Consider two lines, a first line that extends from the disk center 110 to the distal end 204 of the head-carrying assembly 200, and a second line that extends from the disk center 110 to the pivot 205 of the head-carrying assembly 200. An angle 140 measured in the spinning direction 120 from the first line to the second line must be less than 180 degrees.

Figure 3:
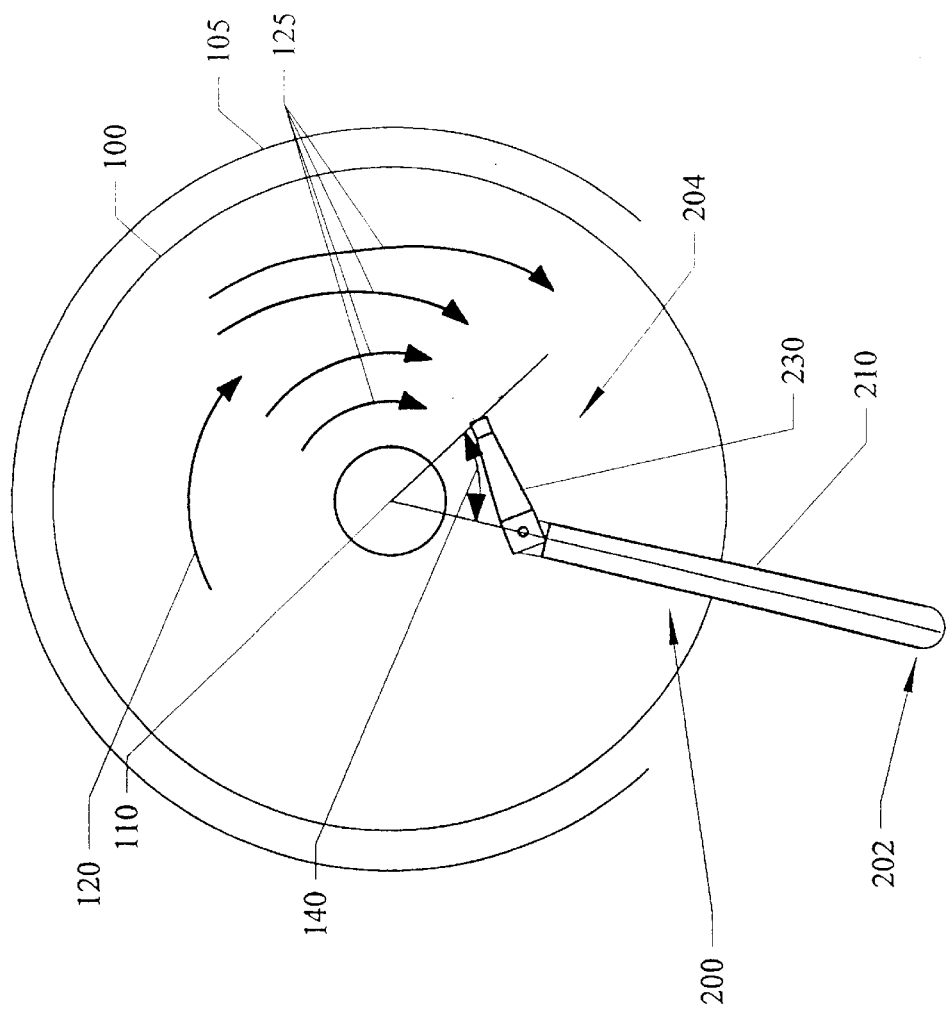
FIG. 3 shows a plan view of a disk drive with the novel orientation of a head-carrying assembly deployable by a linear actuator.

A similar geometric description is applicable to embodiments with linear actuators, where the head-carrying assembly reciprocates, as well as rotary actuators, where the head-carrying assembly rotates. With reference to FIG. 3, the disk drive includes a disk 100 having a disk center 110. As usual the disk 100 spins in a spinning direction 120. The disk drive further includes at least one head-carrying assembly 200 that is deployable adjacent to the disk 100. The distal end 204 of each head-carrying assembly 200 is closer to the disk center 110 than the head-carrying assembly proximal end 202. Each head-carrying assembly 200 has an actuator arm 210 that includes a proximal end and a distal end, a suspension 230 attached to the distal end of the actuator arm 210, and a head (not shown in FIG. 3) carried by the suspension 230. Consider two lines, a first line that extends from the disk center 110 to the head, which is located at the distal end 204 of the head-carrying assembly 200, and a second line that extends from the disk center 110 to the proximal end 202 of the head-carrying assembly 200. An angle 140 measured in the spinning direction 120 from the first line to the second line must be less than 180 degrees.

The issues associated with choosing either a rotary or linear actuator and the detailed implementation in a disk drive are known in the art and will not be discussed further herein. The invention can interface with any known actuators for positioning a head over a disk in a disk drive. In addition, although the further detailed description of the invention will focus on hardware found in hard disk drives, the invention can also be applied to other types of disk drives, such as floppy disk drives, various types of removable-disk disk drives, portable disk drives, and optical-disk disk drives.

As discussed in the "Summary of the Invention," preferred embodiments of the invention dramatically reduce the magnitude of head vibrations. Experiments on track misregistration between two disks in a hard disk drive suggest that the new orientation will reduce the position error signal from arm/suspension vibration about 50%. Therefore, another view of the invention is as a method for reducing head vibrations in a disk drive. The method involves properly orienting each head-carrying assembly with a distal end that is closer to the disk center than its proximal end. In the proper orientation, the angle measured in the spinning direction, between a first line that extends from the disk center to the distal end of the head-carrying assembly and a second line that extends from the disk center to the proximal end of the head-carrying assembly is less than 180 degrees.

In addition to reducing the vibrations, the new orientation also reduces the power consumption of the disk drives. Experiments using a six-disk hard disk drive indicate that with the new orientation, the mechanical drag power will be reduced by about 16% with the head positioned at the outer diameter of the disk and the disk rotating at 10,000 revolutions per minute.

The new orientation is applicable to current single-staged actuators as well as dual-staged actuators, where a second actuator more finely tunes the position of the head.

Figure 1:
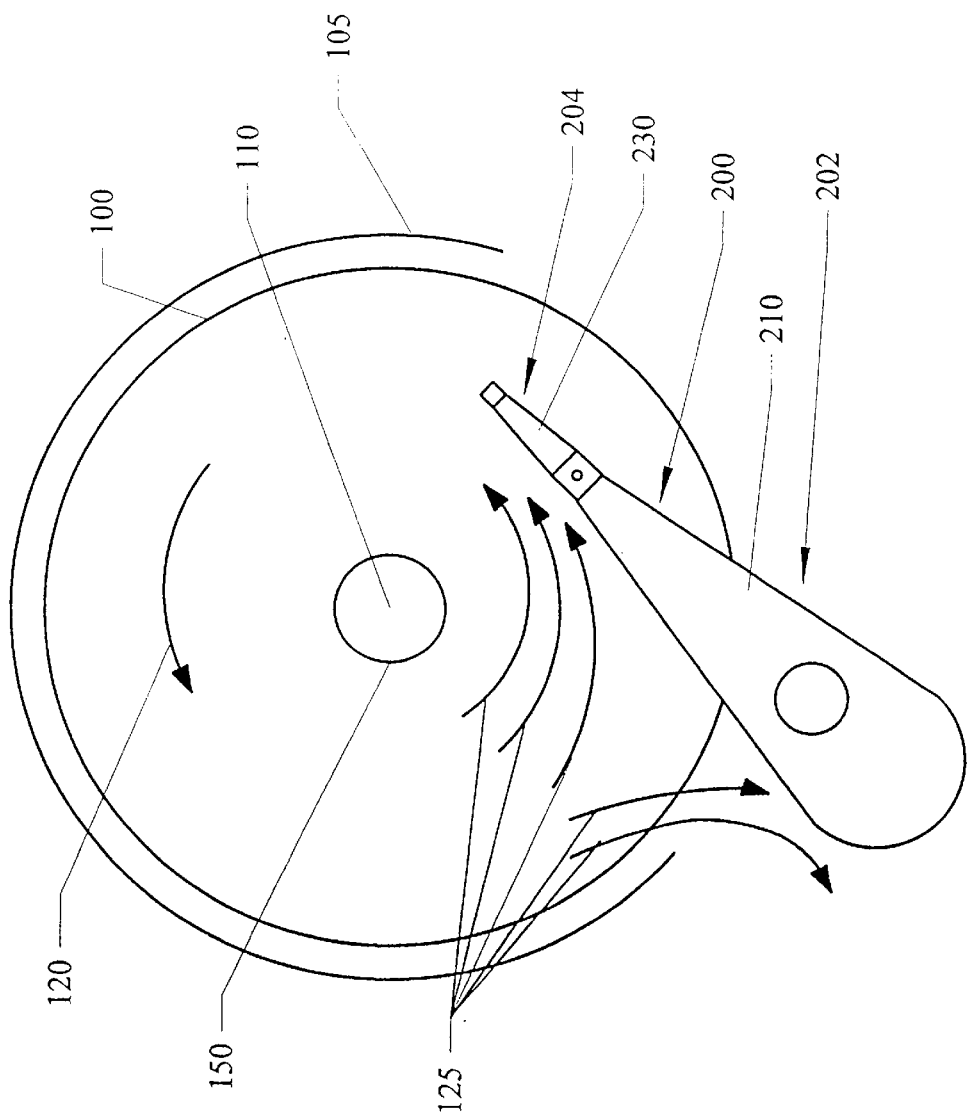
FIG. 1 shows a plan view of a conventional disk drive.

To facilitate further discussion, the new orientation described above and illustrated in FIGS. 2 and 3 will henceforth be called a reverse-flow orientation. The reverse-flow orientation can be obtained either by considering a standard orientation, as illustrated in FIG. 1, and reversing the rotation of the disk and therefore the flow or by considering a standard orientation and reversing the orientation of the head-carrying assembly. Both approaches to producing the reverse-flow orientation produce equivalent results.

Figure 4:
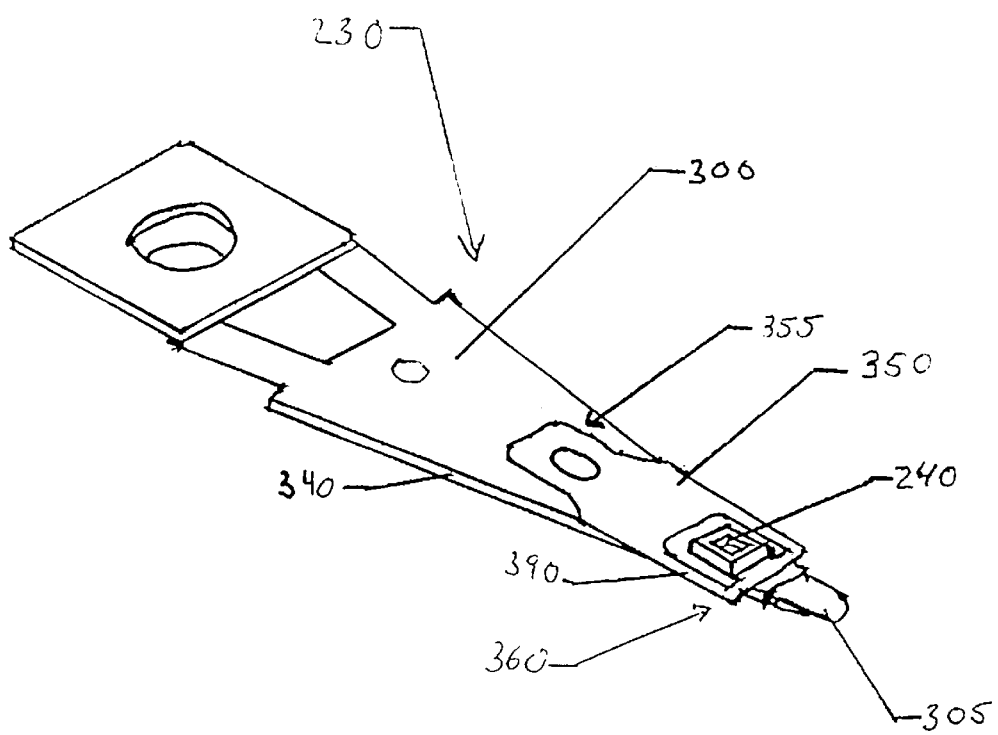
FIG. 4 shows a perspective view of a suspension. The view is from the disk with which the head would interact.

FIG. 4 shows a perspective view of a suspension 230 used in disk drives. The side shown would ordinarily be facing the disk. In its most rudimentary form, a suspension is a structure that is attached to the actuator arm and carries the head. (In most embodiments the head is supported by a slider, which is attached to the suspension, so the suspension indirectly carries the head.) Preferred embodiments include some or all of the additional features disclosed below, but are not necessary in all embodiments of the reverse-flow disk drive.

A good suspension reduces vibrations that would otherwise be experienced by the head. In most embodiments, a suspension 230 includes a load beam 300 and a flexure 350. As used herein, a load beam 300 is the portion of the suspension 230 that is attached to the actuator arm and provides a mounting location for a flexure 350. The flexure 350 is a relatively flexible structure that is attached to the load beam 300. A slider 240 that supports the head is attached to the flexure 350. Additional load beam and flexure features disclosed are included in preferred embodiments, but not in all embodiments of the invention.

The load beam 300 usually includes stiffening rails 340 to minimize bending of the load beam 300 over a significant portion of its length. A load-unload tab 305 is shown at the distal end of the load beam 300. The load-unload tab 305 is used to support the suspension 230 in a parking position when the disk is not spinning.

The flexure 350 has a proximal end 355 that mounts to the load beam 300. A slider 240 is attached to a gimbaled region (obscured by the slider 240) of the flexure 350. Flexure legs 390 at the distal end 360 of the flexure 350 join the gimbaled region to the rest of the flexure 350.

The slider 240 is also known in the art as an air-bearing slider. The head (not shown in the figure) is usually formed as part of the slider 240, but it may be mounted to it. In either case, the head is supported by the slider 240. The slider 240 is designed so that as the disk spins, the slider 240 flies in the induced flow. Generally, elastic forces imposed on the slider 240 by the suspension 230 balance the aerodynamic forces generated on the slider 240. However, as the head-to-disk spacing reduces further in the near future, the slider 240 may contact with disk asperities or the disk surface itself. In such circumstances the force balance is more complex and must include the aerodynamic forces generated on the slider 240, the elastic forces imposed on the slider 240 by the suspension 230, and the contact and frictional forces imposed on the slider 240 by the disk contacts and friction. The gimbaled region of the flexure 230 is designed to accommodate minor angular and translational motions of the slider 240.

FIG. 5A shows a side view of a slider 240 attached to a suspension 230. In this view the disk 100 is below the slider 240 and relative to the slider 240, the flow 125 induced by the rotating disk 100 is from right to left. Consider the slider 240 to be divided into a leading portion 242 and a trailing portion 244. The slider leading portion 242 is that portion of the slider 240 that first encounters the oncoming flow 125. The slider trailing portion 244 is that portion of the slider 240 that last encounters the oncoming flow 125. In the presence of the flow 125, the slider leading portion 242 is upstream of the slider trailing portion 244. The meaning of upstream was defined previously.

Because the direction of the flow relative to the slider varies slightly with the slider's position over the disk, the slider leading and trailing portions are to be determined for the case in which the slider is located at the midpoint of the design range of use of the head supported in the slider. For instance, if the head in the slider were designed to operate from the disk inner diameter to the disk outer diameter, then the midpoint would be halfway between the disk inner and outer diameters. The parking position and other positions that the slider may occupy when the head is not in use should not be used in the computation of the midpoint.

Figure 6:
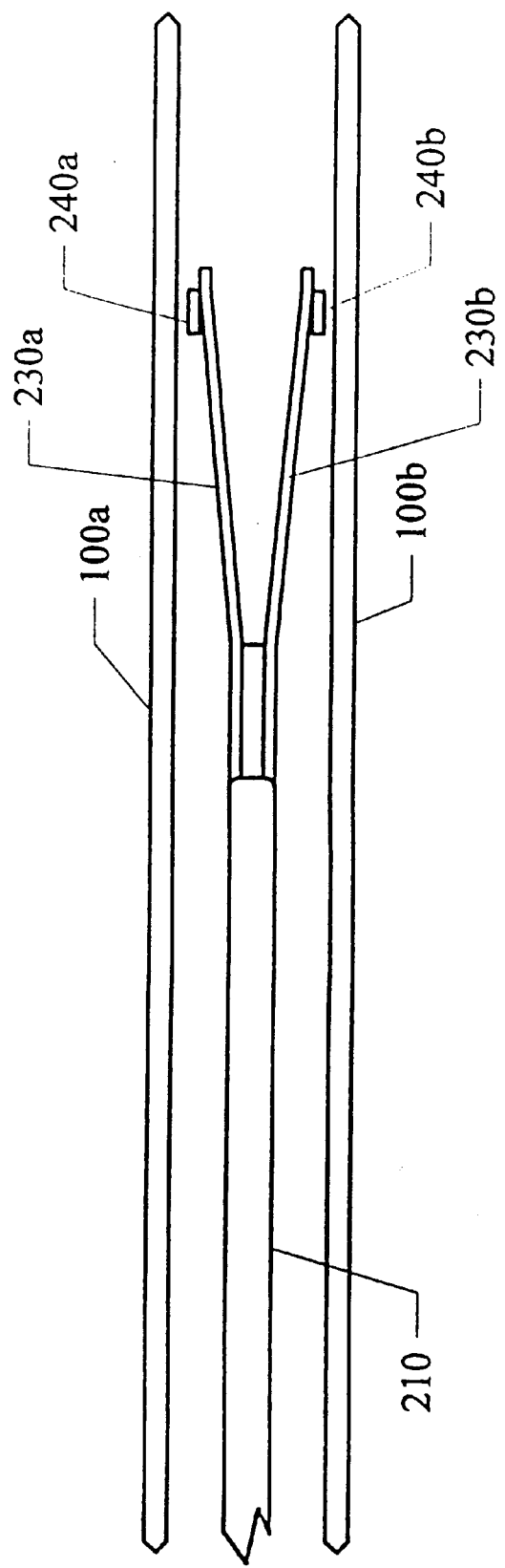
FIG. 6 shows portions of an actuator arm between two disks. Separate suspensions and sliders are associated with each disk surface.

With reference to FIG. 5A, the head 220 communicates with the disk 100. The disk 100 with which the head 220 communicates is designated an associated disk. FIG. 6 illustrates why this terminology is useful. In FIG. 6, a single actuator arm 210 is positioned between two disks 100a and 100b. Two suspensions, 230a and 230b extend from the single actuator arm 210. Sliders 240a and 240b are attached to the respective suspensions 230a and 230b. The head (not shown) supported by slider 240a communicates with the disk 100a. Therefore the disk 100a is the associated disk with respect to the head in the slider 240a.

In FIG. 5A, the slider 240 is depicted with what is known in the art as positive pitch with respect to the flow 125 and the associated disk 100. The flow 125 is shown as it would be for the reverse-flow configuration of the invention. In the figure, the pitch angle is greatly exaggerated. Typical pitch angles are in the range of several hundredths of a degree. Positive pitch implies that the leading portion 242 of the slider 240 is further from the associated disk 100 than the trailing portion 244 of the slider 240. To be definitive, the slider 240 will be considered to have positive pitch if, in the presence of the flow 125, a minimum distance from the slider trailing portion 244 to the associated disk 100 is less than a minimum distance from the slider leading portion 242 to the associated disk 100. Here the phrase "a minimum distance" is to be construed as the minimum distance from any point in the specified region to the associated disk 100. Because the head 220 is almost always disposed in the region of closest approach to the disk 100, the head in a positively pitched slider is almost always in the slider trailing portion 244. For the reverse-flow orientation, the location of the head 220 in the slider trailing portion 244 means that the head 220 is not located at the distal end of the flexure, as it would be in a conventional disk drive. Therefore, as will be discussed later, additional design challenges need to be overcome.

FIG. 5B shows a negatively pitched slider 240. For a negatively pitched slider, a minimum distance from the slider leading portion 242 to the associated disk 100 is less than a minimum distance from the slider trailing portion 244 to the associated disk 100. The inventors are unaware of any prior use of negatively pitched sliders. However, experiments suggest that negatively pitched sliders have less fly-height variation when data is accessed. Negatively pitched sliders also have reduced fly-height sensitivity to the ambient pressure, which increases the range of environments in which the disk drive can be used effectively. In addition, because the head 220 is typically disposed in the region of closest approach to the disk 100, the head in a negatively pitched slider would typically be in the slider leading portion 242. In a disk drive with the reverse-flow orientation, the location of the head 220 in the slider leading portion 242 means that the head 220 is located at the distal end of the flexure. This location facilitates the connection of traces, or conduction leads to the slider 220.

FIG. 7A shows a top view of a portion of a preferred load beam 300. FIG. 7B shows a cross-section view of the load beam 300. For future reference, note the location of the load-beam dimple 315 and the motion-limiter opening 320.

Figure 8:
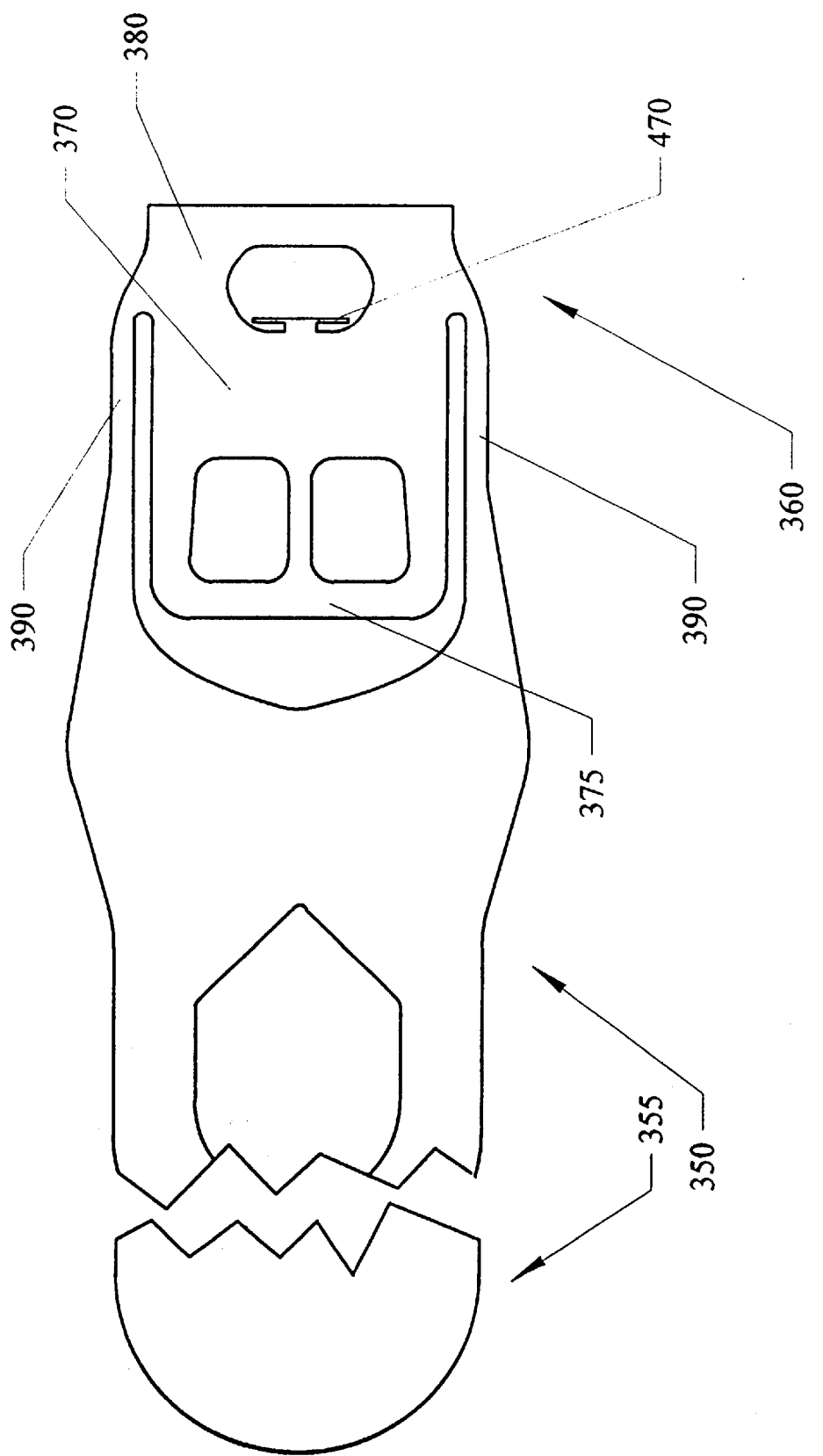
FIG. 8 shows a flexure with a section removed to conserve space.

FIG. 8 shows a plan view of a preferred flexure 350. To conserve space, a portion of the flexure 350 to the right of the flexure proximal end 355 has been removed. The flexure proximal end 355 is mounted to the load beam, usually with a spot weld, although any appropriate means of mounting the flexure 350 to the load beam 300 can be used. The flexure 350 usually extends closer to the disk (not shown) than the load beam 300. The flexure legs 390, nearto the flexure distal end 360, support a gimbaled region 370 to which the slider (not shown) would be attached. The gimbaled region 370 includes a distal end 380 that is coupled to the flexure legs 390 and an opposing proximal end 375.

Figure 9A:
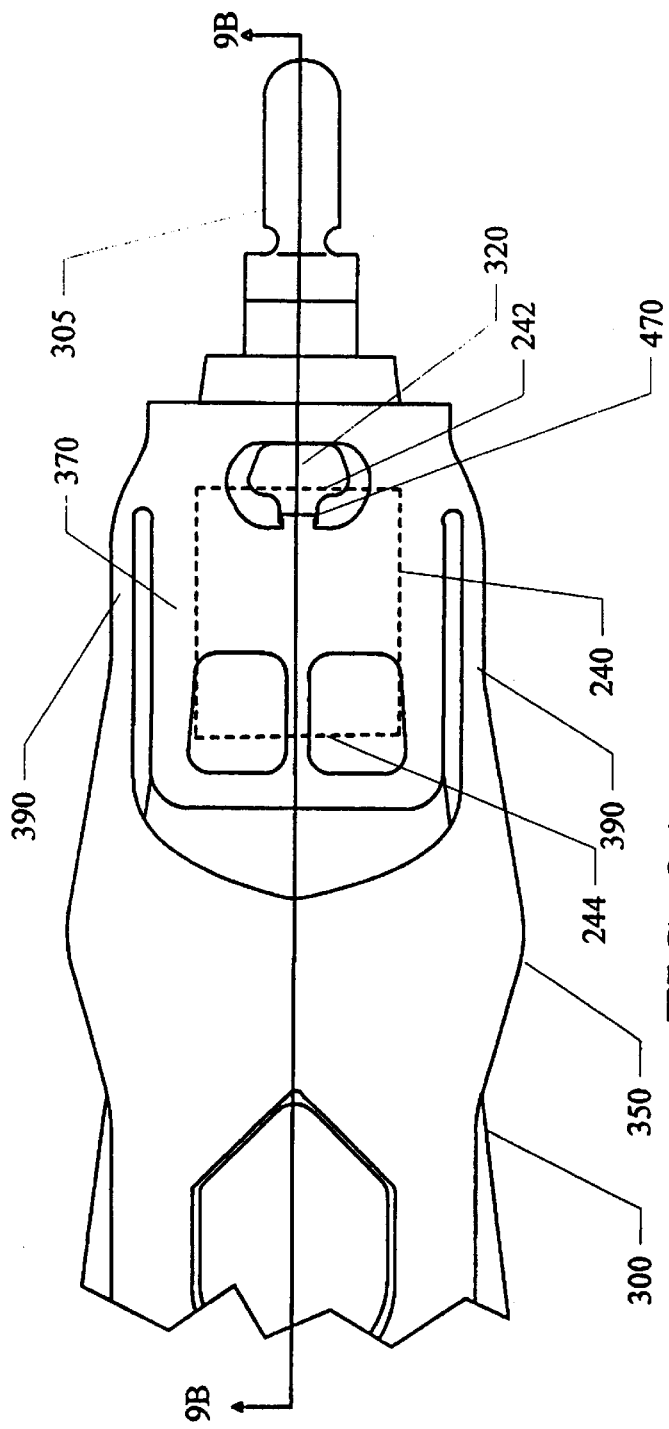
FIG. 9A shows a bottom view of portions of a flexure and a load beam. A slider is shown with dashed lines so as not to obscure too much of the gimbaled region of the flexure.
Figure 9B:
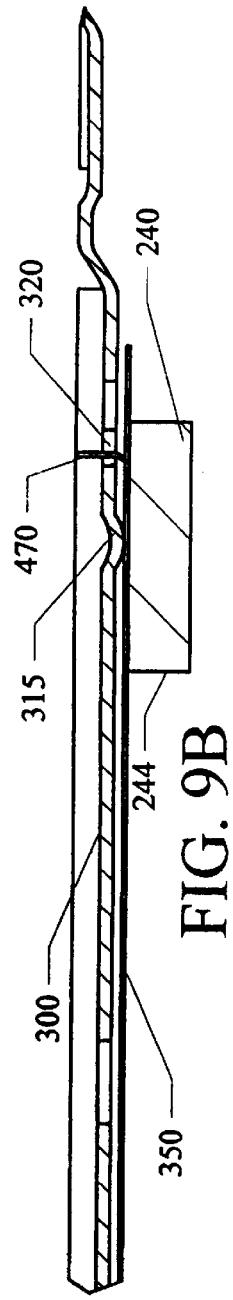
FIG. 9B shows a cross-section view of the flexure and load beam of FIG. 9A.

FIG. 9A shows a view from below of a portion of a preferred flexure 350 mounted on a load beam 300. The location of the slider 240 is included with a dashed line so as not to obscure too much of the gimbaled region 370 of the flexure 350. FIG. 9B shows a cross-section view from the side. Here the slider 240 is shown with solid lines. In preferred embodiments, the slider 240 is attached to the gimbaled region 370 using an adhesive, although any suitable means of attachment is acceptable.

A preferred motion limiter 470 is shown in the gimbaled region 370 of the flexure 350. Note that the motion limiter 470 passes through the motion limiter opening 320 of the load beam 300 so as to facilitate interaction with the load beam 300.

Ordinarily a motion limiter 470 in a flexure 350 is used to prevent excessive displacement of the slider 240, and hence the gimbaled region 370, away from the load beam 300. However, with reverse-flow orientations, preferred embodiments employ a motion limiter 470 that also limits the displacement of the gimbaled region 370 towards the flexure proximal end (shown in FIG. 8 as 355). The reason for this is that for reverse-flow orientations, the flow relative to the flexure 350 is from right to left. Aerodynamic drag and any contact drag from the disk 100 on the slider 240 would place compressive loads on the flexure legs 390. If the compressive loads became excessive, the flexure legs 390 might buckle. By limiting the displacement of the gimbaled region 370 towards the flexure proximal end, the motion limiter 470, supported by the load beam 300, assumes some of the load that would otherwise tend to buckle the flexure legs 390.

A detail of a preferred motion limiter 470 that is designed to limit displacement both away from the load beam 300 and towards the flexure proximal end is shown in FIGS. 10A–10C. The motion limiter 470 comprises a motion-limiter tab 480 that is fixed to the gimbaled region 370 and projects from the gimbaled region 370 and through the motion-limiter opening 320 in the load beam 300. A motion-limiter catch 490 is attached to the motion-limiter tab 480. If the gimbaled region 370 were to be displaced too far away from the load beam 300, the motion-limiter catch 490 would press against the load beam 300 and resist further displacement of the gimbaled region 370 away from the load beam 300. If the gimbaled region 370 were to be displaced too far towards the flexure proximal end, the motion-limiter tab 480 would press against the load beam adjacent the motion-limiter opening 320 and resist further displacement of the gimbaled region 370 towards the proximal end of the flexure. Preferably, the motion-limiter catch 490 is approximately perpendicular to the motion-limiter tab 480 and extends to both sides of the motion-limiter tab 480. Such an arrangement tends to resist excessive rolling of the gimbaled region 370 to either side.

Many variations of the motion limiter can be imagined and will be considered part of the invention as long as the motion limiter is fixed to the gimbaled region and interacts with the load beam to limit the displacement of the gimbaled region both away from the load beam and towards the flexure proximal end. For instance, the relative angles and sizes of the motion limiter tab and catch can be varied, the motion limiter catch can be oriented along the length of the flexure, rather than along its width, the motion limiter can include curved structures, etc. In addition the motion limiter does not need to include substantially rigid stops to limit the motion, but may also limit the motion by gradually increasing the resisting force.

Although the disk drive suspension described above is particularly well suited for use in a reversed-flow disk drive, embodiments of the disk drive suspension with the motion limiter described above can be used in a conventional-flow disk drive.

Referring back to FIG. 9A, in the case of a positively pitched slider 240 with the head located near the point of closest approach to the disk, the head would be located in the slider trailing portion 244. In a conventional disk drive with a positively pitched slider, the head would also be located in the slider trailing portion. However, in a conventional disk drive, the slider trailing portion would be near to the distal end of the gimbaled region, rather than near to the proximal end of the gimbaled region, as it is with the reversed-flow configuration. The location of the head near to the proximal end 375 of the gimbaled region 370 presents new challenges for the routing of traces, or conduction leads, which are used for conducting signals to and from the head. In the most preferred embodiments the traces are copper.

Preferably the traces connect to mounting pads that are then soldered to the slider in the vicinity of the head. The proximity of the head to the soldered connections reduces the need for extensive conduction routes in the slider. With the conventional disk drive, with the head near the distal end of the gimbaled region, the traces only needed to be routed to the distal end of the gimbaled region. In the case of the reversed-flow configuration, with a positively pitched slider, new routing schemes for the traces need to be developed.

Figure 11:
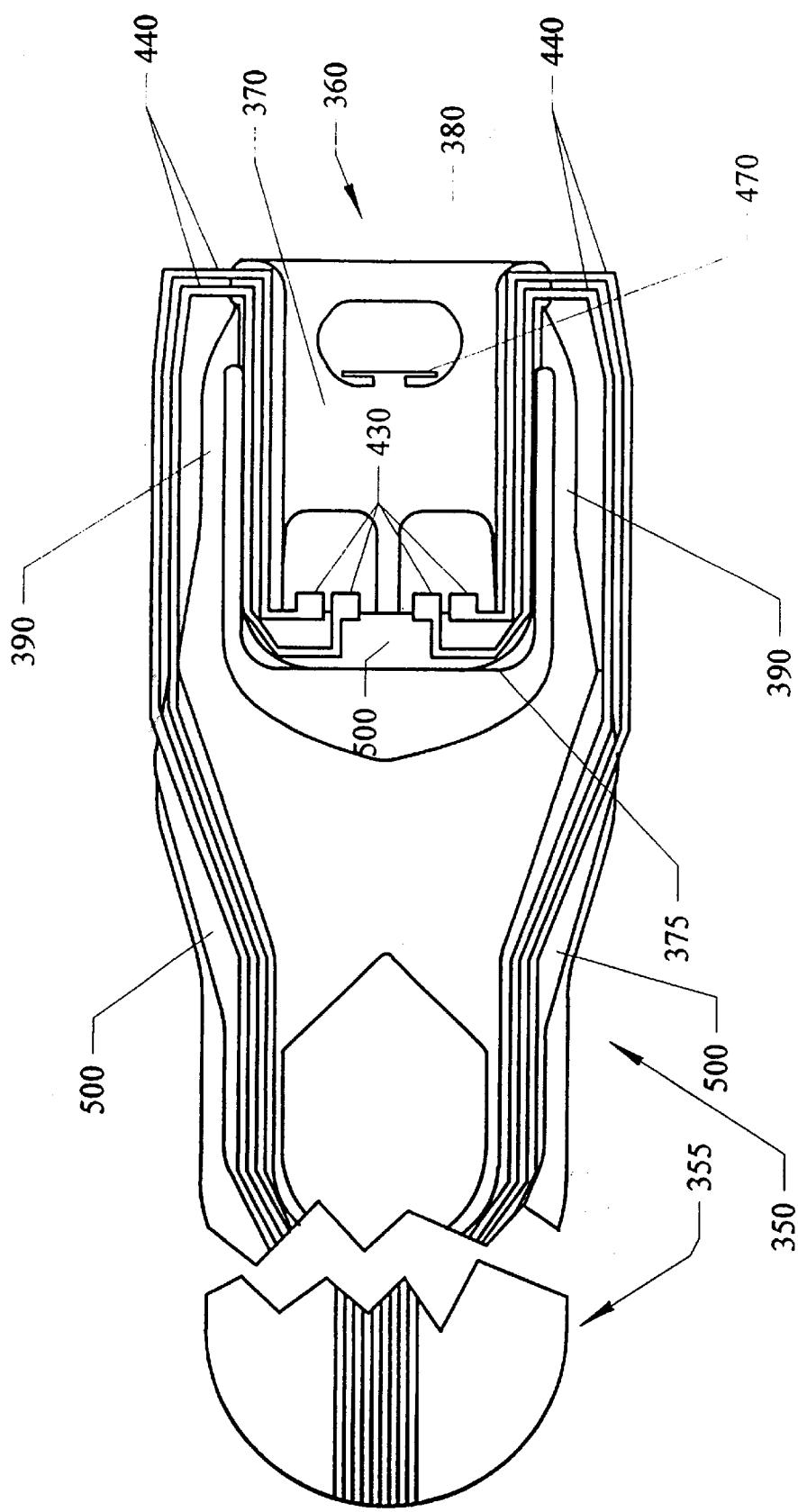
FIG. 11 shows a flexure (with a section removed to conserve space) with traces routed alongside the flexure legs.
Figure 12:
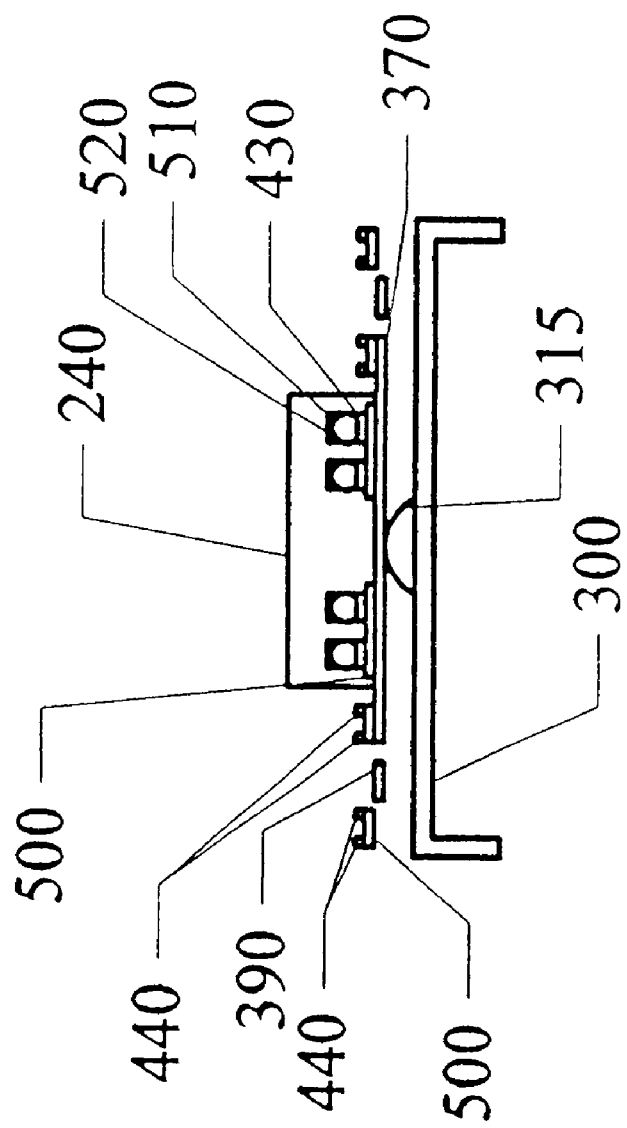
FIG. 12 shows a cross-section view of a load beam, flexure, and slider with traces. Details of the electrical connection to the slider are shown.

FIG. 11 shows an embodiment of a flexure 350 and traces 440 for conducting signals. Termination pads 430 are included near the gimbaled region proximal end 375. The slider is not shown in FIG. 11, but is shown in a generic cross-section view, shown in FIG. 12. Note that the view orientation in FIG. 12 is such that the slider 240 is on top and the load beam 300 is on bottom. Referring back to FIG. 11, sets of traces 440 are routed approximately alongside the flexure legs 390. Then the traces 440 are routed from the distal end 380 of gimbaled region 370 to the proximal end 375 of the gimbaled region 370. In preferred embodiments, an insulating layer 500 separates the traces 440 from the flexure 350. In the most preferred embodiments, the insulating layer is a polyimide. As shown in FIG. 12, in the preferred embodiments, slider connector pads 520 are electrically connected to the termination pads 430 with a ball 510 of solder, gold, or other appropriate material.

Figure 13:
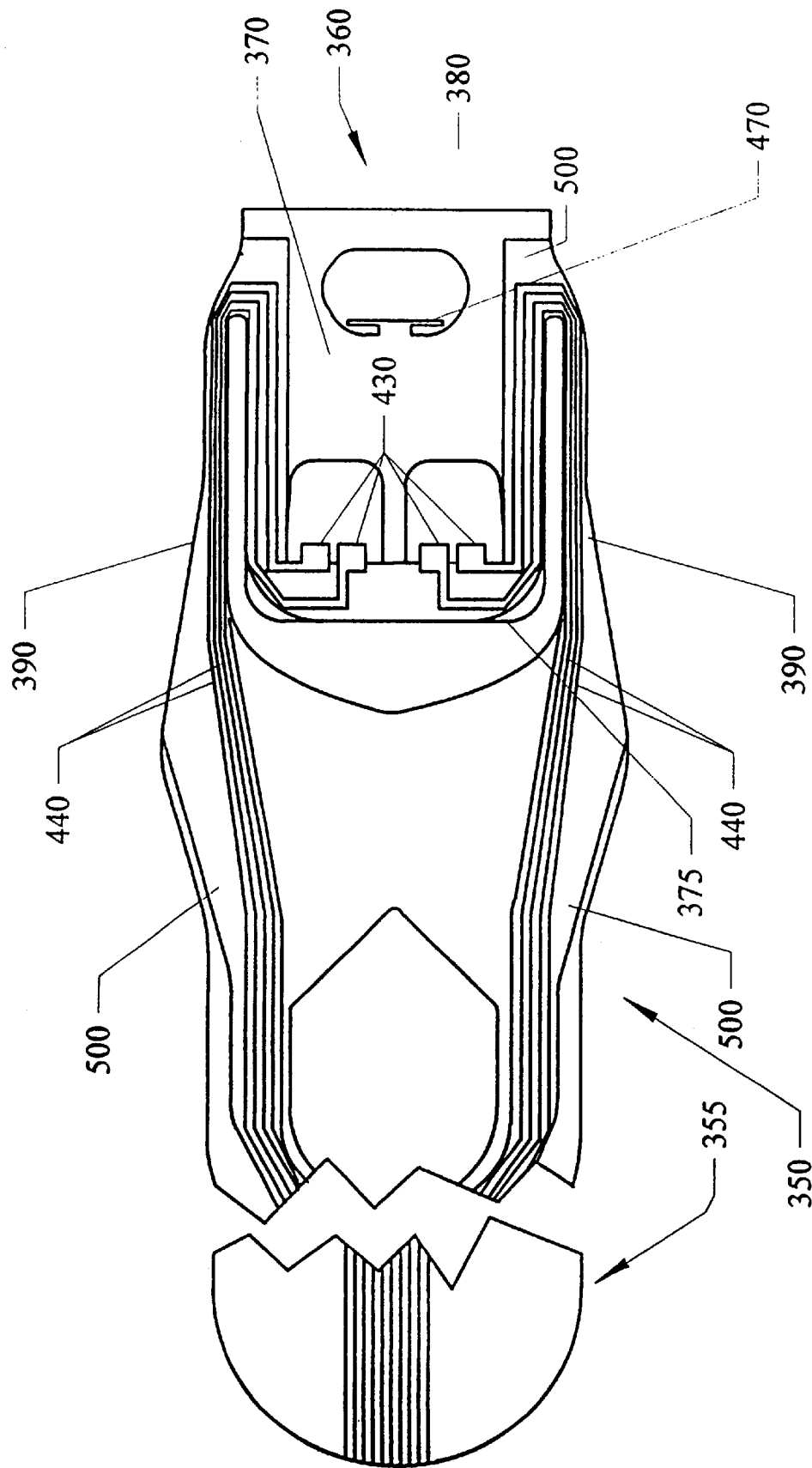
FIG. 13 shows a flexure (with a section removed to conserve space) with traces routed on the flexure legs.

Another embodiment of a flexure 350 and traces 440 is shown in FIG. 13. This embodiment is similar to that shown in FIG. 11, except that the traces 440 are routed on the flexure legs 390. Under most circumstances, the embodiment illustrated in FIG. 11 is preferred over that illustrated in FIG. 13 because the structural characteristics of the flexure legs 390 could be altered if the traces 440 are routed on the flexure legs 390.

In preferred embodiments, all of the traces 440 are routed similarly. However, embodiments in which some of the traces 440 are routed one way (for instance as shown in FIG. 1) and some of the traces are routed another way (for instance as shown in FIG. 13) are included within the scope of the invention.

The embodiments shown in FIGS. 11 and 13 include gimbaled regions 370 that are somewhat wider than those used with conventional disk drives. The extra width was required to provide space on the gimbaled region 370 for the traces 440 to be routed from the distal end 380 to the proximal end 375. Alternative embodiments can eliminate the need for this extra width.

Figure 14:
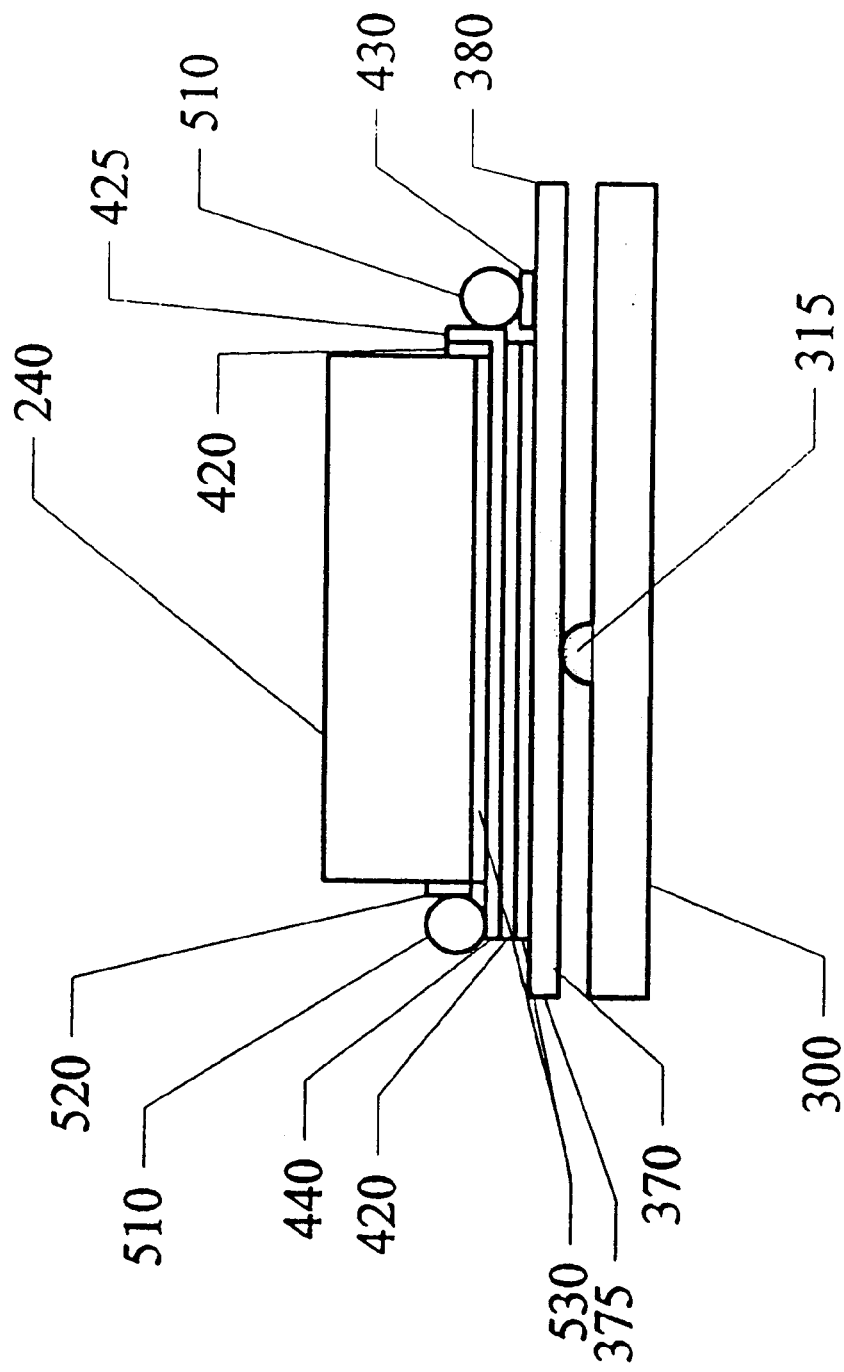
FIG. 14 shows a side view of a load beam, flexure and slider with an interposer to provide a separation between the gimbaled region of the flexure and the slider.

FIG. 14 shows an embodiment that includes an interposer 420 that spaces the gimbaled region 370 of the flexure from the slider 240. To aid in orienting the reader, the load beam 300 and the load-beam dimple 315 are shown. In this embodiment, each trace 440 is routed from the distal end 380 to the proximal end 375 in the space provided between the gimbaled region 370 and the slider 240. Although this embodiment eliminates the need for the extra width in the gimbaled region 370, the reduction in the width comes with a price. As shown in FIG. 14, two adhesive layers 530 are used, rather than the single adhesive layer that would ordinarily attach the slider 240 to the gimbaled region 370 of the flexure. An additional ball 510 of solder, gold, or other appropriate material is also used for each trace 440. In this embodiment, a termination pad 430 on the gimbaled region 370 of the flexure and an interposer pad 425 are electrically connected with a ball 510 of solder, gold, or other appropriate material. The interposer pad 425 is connected to the trace 440 that goes under the slider 240 and is electrically connected to the slider 240 at the slider connector pad 520 with a ball 510 of solder, gold, or other appropriate material.

Figure 15:
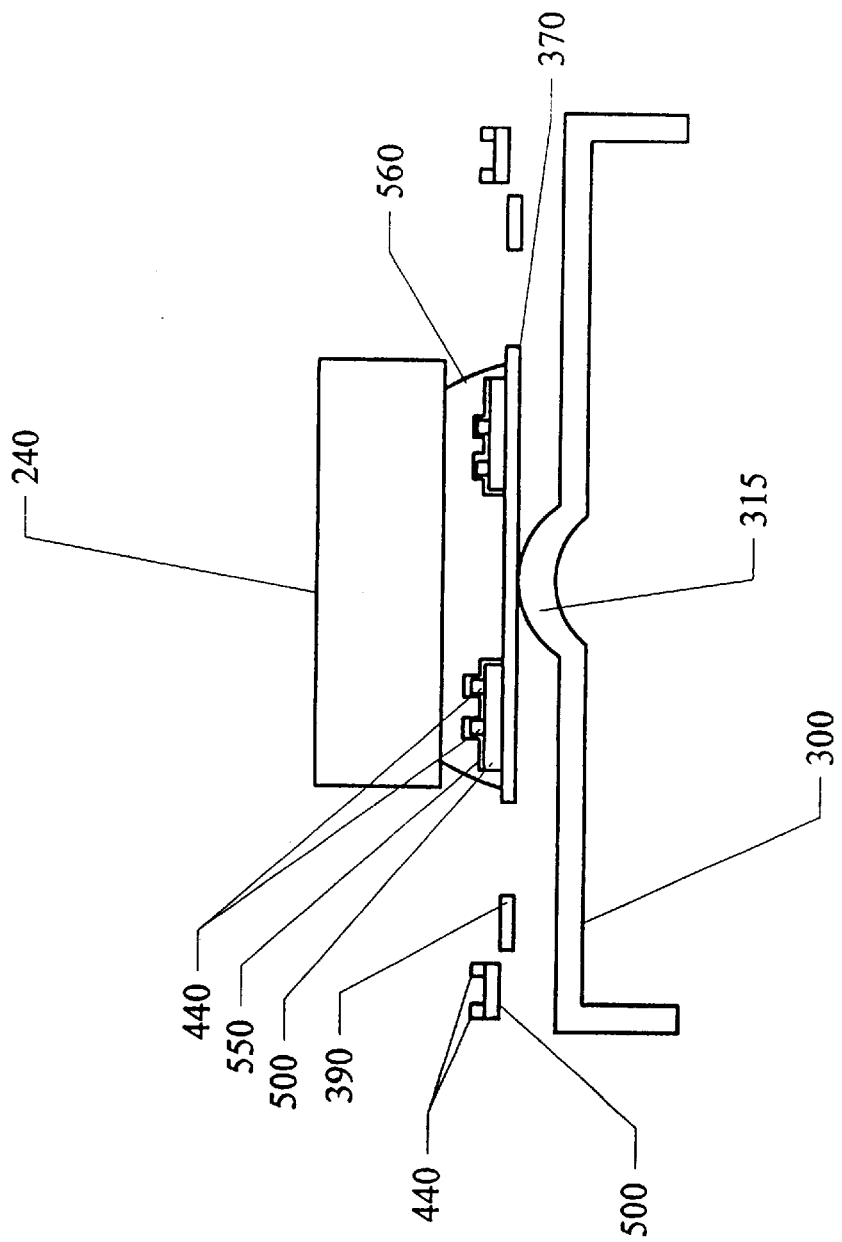
FIG. 15 shows a cross-section view of a load beam, flexure, and slider with traces routed between the slider and the gimbaled region.

Another embodiment that does not require a wider gimbaled region 370 is illustrated in FIG. 15, which shows a cross-section view similar to that shown in FIG. 12. However, in this embodiment, the traces 440 are routed between the gimbaled region 370 and the slider 240, rather than along the side of the slider 240. In the embodiment shown in FIG. 15, the traces 440 are routed alongside the flexure legs 390 to the distal end of the gimbaled region 370. From there the traces 440 are routed between the gimbaled region 370 and the slider 240 from the distal to the proximal end of the gimbaled region 370. In alternate embodiments, the traces 440 and their insulating layer 500 may be routed on the flexure legs 390 as shown in FIG. 13, before being routed between the gimbaled region 370 and the slider 240. As with other trace-routing schemes, not all traces 440 need to be routed similarly.

With reference again to FIG. 15, most preferably, a conductive adhesive 560 is used to adhere the slider 240 to the gimbaled region 370. An insulating layer 500, most preferably a polyimide layer, separates the traces 440 from the gimbaled region 370. An insulating cover layer 550 separates the traces 440 from the conductive adhesive 560. The use of a conductive adhesive 560 provides a grounding path between the slider 240 and the gimbaled region 370 and hence is preferred. A typical consequence of this arrangement is the additional thickness of the conductive adhesive 560 between the pairs of traces 440. A side benefit of the additional thickness of the conductive adhesive 560 in this region is a greater damping effect when the gimbaled region 370 contacts the load-beam dimple 315.

Figure 16:
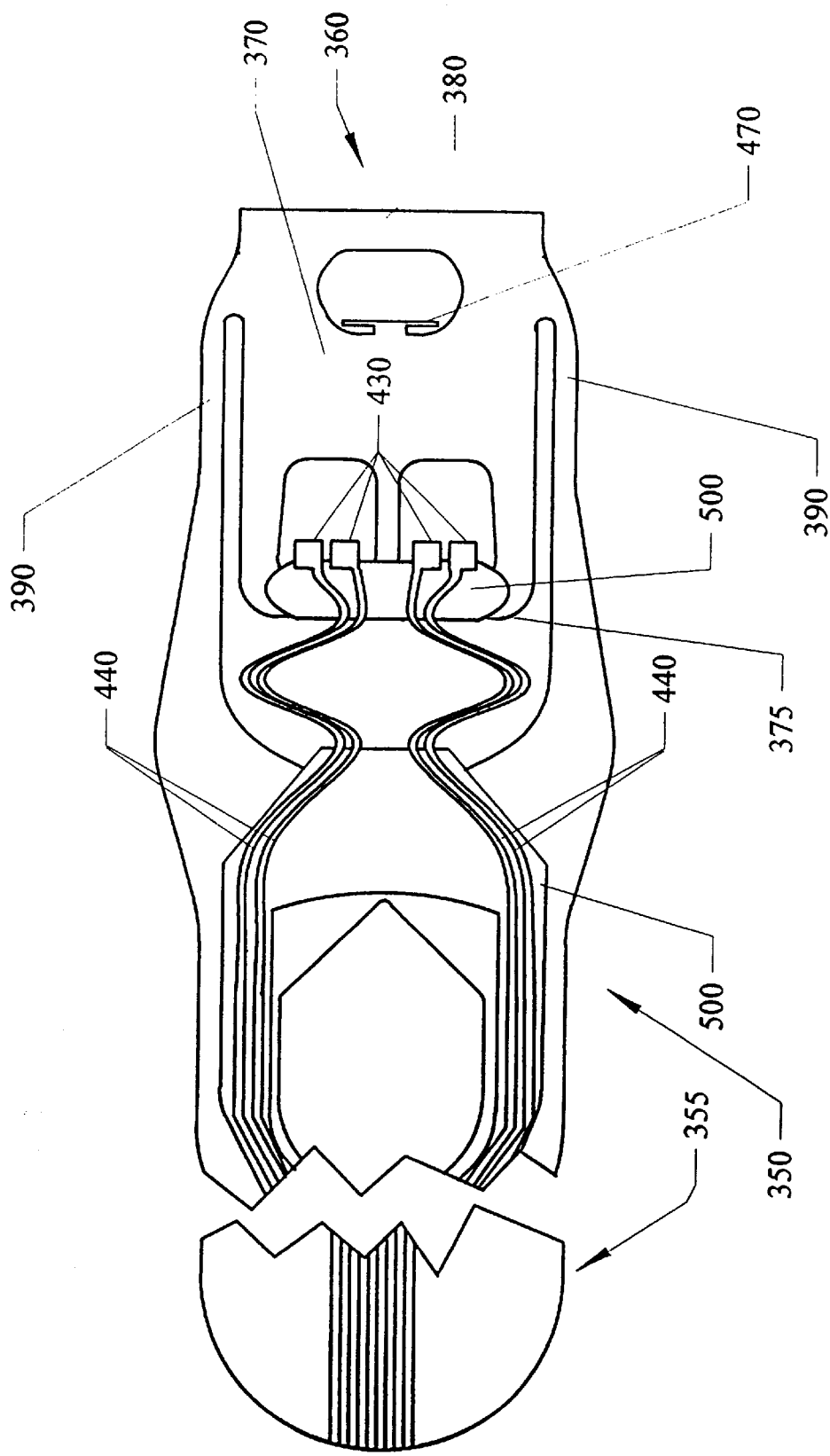
FIG. 16 shows a flexure (with a section removed to conserve space) with serpentine traces.
Figure 17:
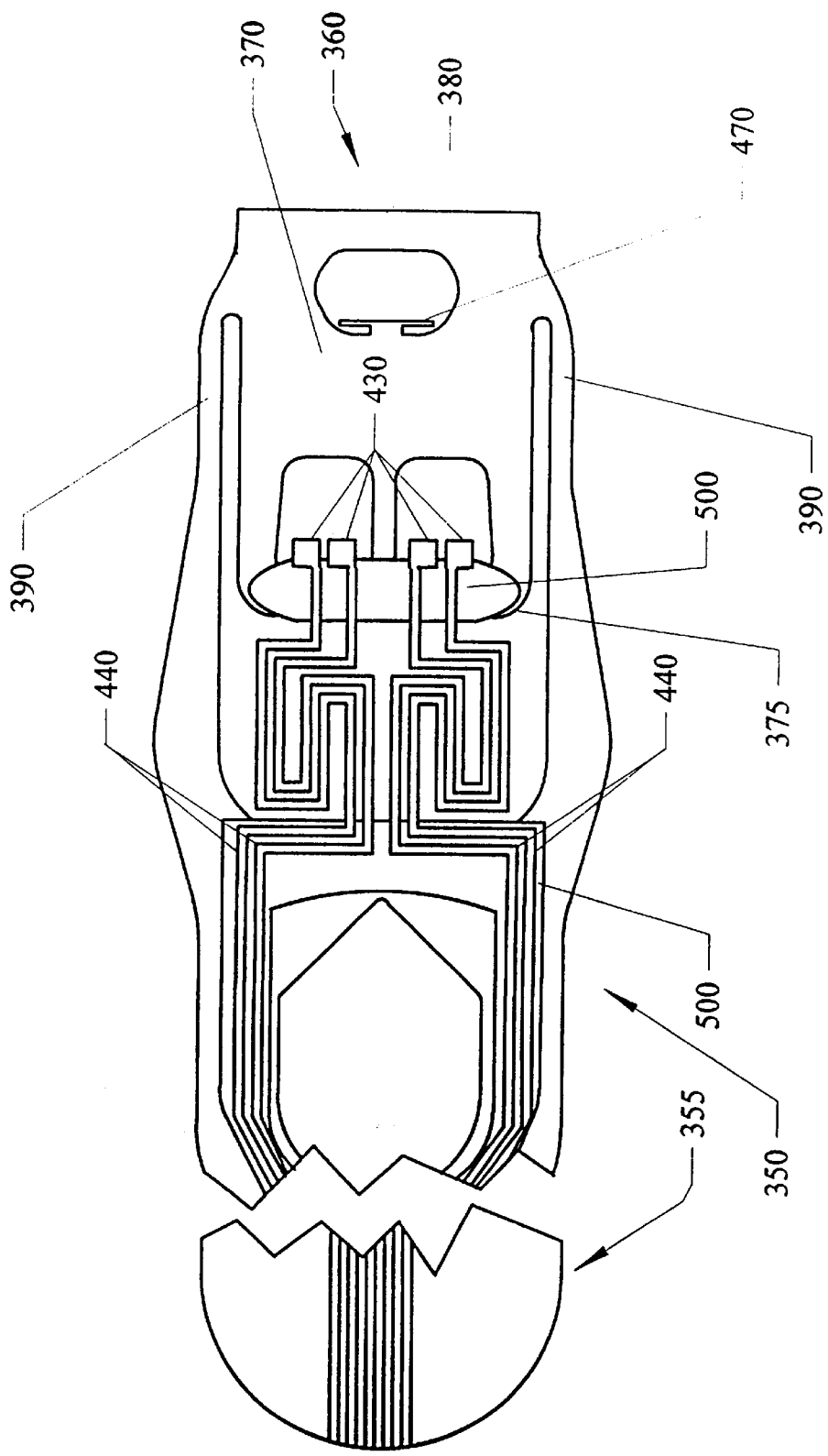
FIG. 17 shows another alternative embodiment of a flexure (with a section removed to conserve space) with serpentine traces.

Yet another embodiment that does not require a wider gimbaled region 370 is illustrated in FIG. 16. In this embodiment the traces 440 are routed in serpentine paths that do not extend along or on one flexure leg prior to connecting to their respective termination pads 430. The serpentine paths provide each trace 440 with a longer length, thereby reducing the effective stiffness of the trace 440. The reduced effective stiffness is desirable in that it interferes less with any movement of the gimbaled region 370. FIG. 17 shows another embodiment of a flexure 350 with traces 440 that are routed in serpentine paths.

The above description and drawings are only illustrative of preferred embodiments, and the present invention is not intended to be limited thereto. Any modification of the present invention that comes within the spirit and scope of the following claims is considered part of the present invention.

What is claimed is:

1. A disk drive suspension, comprising:

a load beam;

a flexure having a flexure proximal end that is mounted to the load beam and an opposing flexure distal end, the flexure comprising flexure legs nearto the flexure distal end, the flexure legs supporting a gimbaled region having a distal end coupled to the flexure legs, and an opposing proximal end;

a motion limiter that is fixed to the gimbaled region and interacts with the load beam to limit the displacement of the gimbaled region both away from the load beam and towards the flexure proximal end; and a plurality of traces with connections, wherein said connections are located on said proximal end of said gimbaled region of said flexure for making electrical contact with a head on a slider.

2. The disk drive suspension, according to claim 1, wherein the load beam includes a motion-limiter opening and the motion limiter comprises a motion-limiter tab that is fixed to the gimbaled region and projects from the gimbaled region through the motion-limiter opening and a motion-limiter catch that is attached to the motion-limiter tab.

3. The disk drive suspension, according to claim 2, wherein the motion-limiter catch is approximately perpendicular to the motion-limiter tab and extends to both sides of the motion-limiter tab.

* * * * *